(12) United States Patent
Abdul-Razzak et al.

(10) Patent No.: US 8,854,372 B2
(45) Date of Patent: Oct. 7, 2014

(54) CONSOLIDATION AND VISUALIZATION OF A SET OF RAW DATA CORRESPONDING TO A COMMUNICATION BETWEEN A PERSON OF INTEREST AND A CORRESPONDENT ACROSS A PLURALITY OF MEDIUMS OF COMMUNICATION

(75) Inventors: Mohammed Abdul-Razzak, Union City, CA (US); Subhrajyoti Ray, San Jose, CA (US)

(73) Assignee: SS8 Networks, Inc., Milpitas, CA (US)

( * ) Notice: Subject to any disclaimer, the term of this patent is extended or adjusted under 35 U.S.C. 154(b) by 284 days.

(21) Appl. No.: 13/336,629

(22) Filed: Dec. 23, 2011

(65) Prior Publication Data
US 2013/0162648 A1    Jun. 27, 2013

(51) Int. Cl.
*G06T 11/20* (2006.01)
(52) U.S. Cl.
USPC .......................................................... 345/440
(58) Field of Classification Search
USPC .......................................................... 345/440
See application file for complete search history.

(56) References Cited

U.S. PATENT DOCUMENTS

| | | | | |
|---|---|---|---|---|
| 2012/0143972 | A1* | 6/2012 | Malik et al. | 709/206 |
| 2012/0150955 | A1* | 6/2012 | Tseng | 709/204 |
| 2012/0210427 | A1* | 8/2012 | Bronner et al. | 726/23 |
| 2012/0266081 | A1* | 10/2012 | Kao | 715/751 |
| 2013/0155068 | A1* | 6/2013 | Bier et al. | 345/440 |

OTHER PUBLICATIONS

Amer-Yahia, Sihem, Laks Lakshmanan, and Cong Yu. "Socialscope: Enabling information discovery on social content sites." arXiv preprint arXiv:0909.2058 (2009).*

* cited by examiner

*Primary Examiner* — David Zarka
*Assistant Examiner* — Vu Nguyen
(74) *Attorney, Agent, or Firm* — Raj Abhyanker, P.C.

(57) ABSTRACT

Systems and methods of consolidation and visualization of a set of communication and transaction data associated with a person of interest (POI) and a set of correspondents of the POI are disclosed. In one embodiment, the method may include consolidating the set of communication and transaction data associated with communications between the POI and the correspondent of the POI across a plurality of mediums of communication in an organized reconstruction folder. The method may also include a graphical representation of the communication between the POI and the correspondent of the POI A when the organized reconstruction folder has been created. The method also includes embedding the organized reconstruction folder under the communication link such that the organized reconstruction folder is immediately viewable when an analyst selects the communication link between the POI and the correspondent of the POI A.

19 Claims, 4 Drawing Sheets

CONSOLIDATION AND VISUALIZATION OF A SET OF RAW DATA CORRESPONDING TO A COMMUNICATION BETWEEN A PERSON OF INTEREST AND A CORRESPONDENT ACROSS A PLURALITY OF MEDIUMS OF COMMUNICATION

FIELD OF TECHNOLOGY

This disclosure relates to a consolidation of a set of raw data associated with a set of communications between a person of interest (POI) and a set of correspondents of the POIb to be used by an analyst.

BACKGROUND

An analyst (e.g., a law enforcement analyst, a financial analyst, an analyst managing finance/stocks/mutual-funds, an analyst at an IT department, a marketing analyst, a local police officer, a secret agent, a member of an intelligence agency etc.) may want to monitor a person of interest (POI) to understand a set of interactions he may have with a set of correspondents or contacts. The analyst may be interested in understanding and studying a whole set of online behavior associated with the POI. The analyst may be interested in seeing the information represented visually, and want to simultaneously pull up a set of raw data corresponding to a particular communication. The analyst may want to collect as much information as possible visually without consulting the underlying set of raw data. The analyst may always want to determine that a particular communication occurred with the POI and a correspondent, and to track the communication between the POI and the correspondent. The analyst may want to view and instantly record and analyze a communication between a POI and the correspondent of the POI. In many cases, the analyst may not be able to make sense of a vast amount of information regarding the POI and a set of correspondents of the POI, and the analyst may be unable to make a connection between the POI and a particular correspondent. This, in turn, may mean that the analyst miss an important lead, and may end up wasting time and energy on a case that may have been resolved much faster. Such inefficiencies may prove costly for the analyst in addition to causing financial losses to relevant parties involved in the case.

SUMMARY

This disclosure relates to a consolidation of a set of raw data associated with a set of communications between a person of interest (POI) and a set of correspondents of the POI to be used by an analyst and presenting the communication association through a set of link charts while providing a capability to render details of the communications on demand from the link charts.

The methods and the systems disclosed herein may be implemented in any means for achieving various aspects. Other features will be apparent from the accompanying drawings and from the detailed description that follows.

In one aspect, the application discloses a method comprising determining that a person of interest (POI) has communicated with a correspondent of the POI A, creating a communication link between the POI and the correspondent of the POI A, consolidating a set of communication and transaction data corresponding to a communication between the POI and the correspondent of the POI A across a plurality of mediums of communications in an organized reconstruction folder associated with communications between the POI and the correspondent of the POI A, generating a link chart associated with the POI to visually represent the communication link between the POI and the correspondent of the POI A, and embedding the organized reconstruction folder associated with communications between the POI and correspondent of the POI A within the communication link within the link chart between the POI and the correspondent of the POI A such that the organized reconstruction folder automatically populates when a user selects the link in the link chart between the POI and the correspondent of the POI A.

In another aspect, the application discloses another method comprising determining that a person of interest (POI) has communicated with a correspondent of the POI A when a first communication instance occurs between the POI and the correspondent of the POI A, automatically creating an organized reconstruction folder associated with communications between the POI and the correspondent of the POI A when the first communication instance occurs between the POI and the correspondent of the POI A, automatically creating a communication link between the POI and the correspondent of the POI A in a link chart when the first communication instance occurs between the POI and the correspondent of the POI A, and embedding the organized reconstruction folder associated with communications between the POI and correspondent of the POI A under the communication link on the link chart between the POI and the correspondent of the POI A in the link chart.

In yet another aspect, the application also discloses a system comprising a processor communicatively coupled with a volatile memory and a non-volatile storage further comprising a reconstruction module, to consolidate, process and organize a set of communication and transaction data associated with a communication between a POI and a correspondent of the POI A across a plurality of mediums of communications in an organized reconstruction folder associated with communications between the POI and correspondent of the POI A and a visualization module, to automatically create a communication link between the POI and the correspondent of the POI based on the set of communication and transaction data associated with the communication between the POI and the correspondent of the POI A in a link chart.

The methods and the systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

Figure 1:
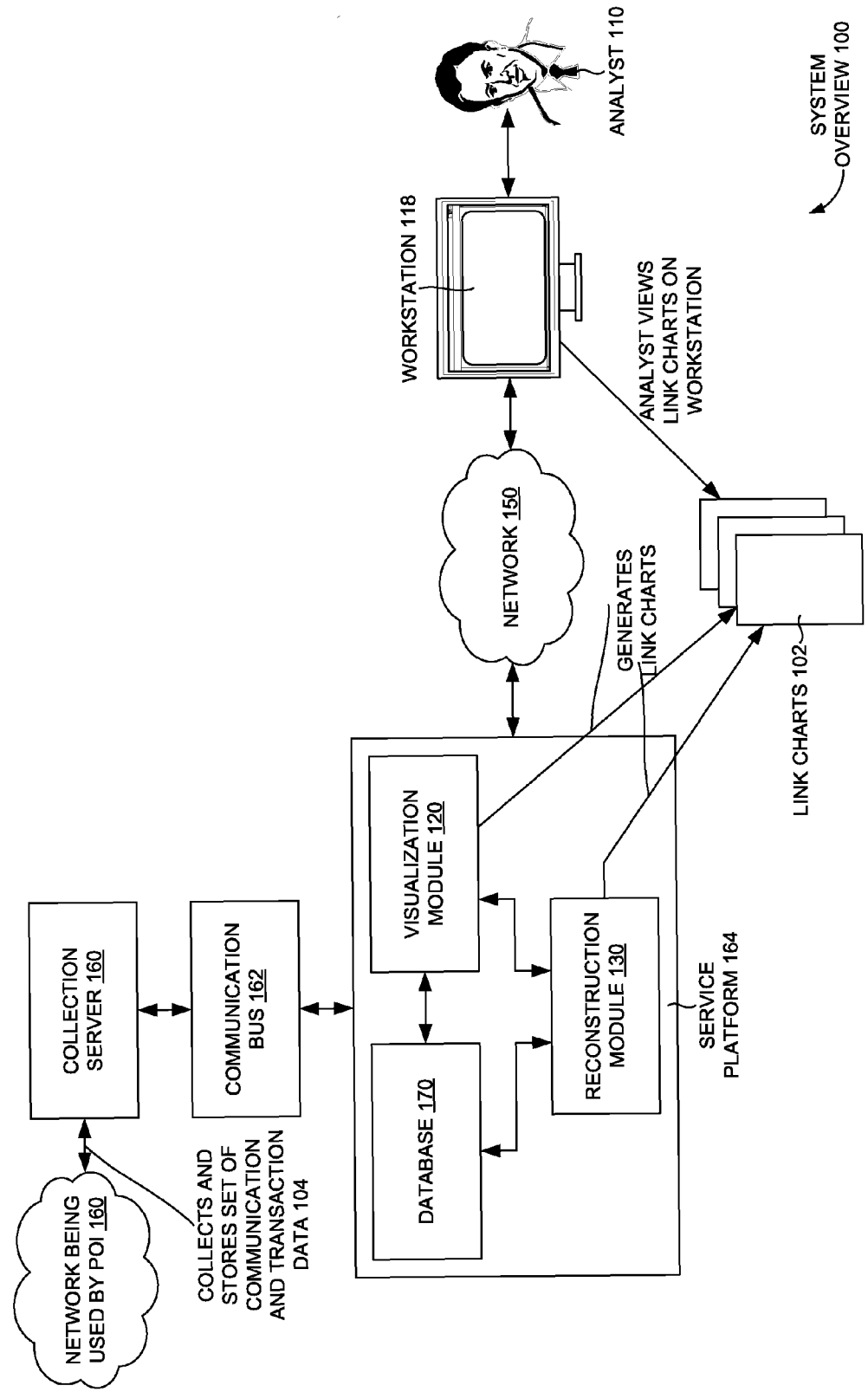
FIG. 1 illustrates the system architecture showing the service platform, the data processing engine, the reconstruction module, and the visualization module being used by an analyst at the workstation.

This disclosure relates to a consolidation of a set of raw data associated with a set of communications between a person of interest (POI) and a set of correspondents of the POI to be used by a law enforcement agent and presenting the communication association through a set of link charts while providing a capability to render details of the communications on demand from the link charts.

In the following description, for the purposes of explanation, numerous specific details are set forth in order to provide a thorough understanding of the various embodiments. It will be evident, however, to one skilled in the art that the various embodiments may be practiced without these specific details.

System Overview

The application discloses a method and system to automatically consolidate a set of raw data associated with a set of communications between a POI and a set of correspondents of the POI and to present the set of communications visually by automatically generating a set of link charts with on-demand retrieval of raw data underlying the set of link charts.

In one or more embodiments, an analyst of the system may be an analyst at a law enforcement agency, or a management consultancy and may want to collect, consolidate, analyze and visualize a set of raw data acquired through legal means. In one or more embodiments, the analyst may be a part of an intelligence agency, a police force, a law enforcement consulting company and/or management company. In one or more embodiments, the analyst may be part of an investigation. The investigation may be a criminal investigation, a civil investigation, an investigation of an employee violating a corporate regulation/conduct, investigation to ascertain compliance with laws and regulations as well as creating reports verifying such compliance, an investigation to save money and/or resources for a company or any other investigation.

A. Data Collection

In one or more embodiments, the system may be able to collect and consolidate a set of raw data associated with the POI. In one or more embodiments, the system may comprise of a set of collection servers that may further comprise a set of collection interface modules that receive legally collected data. In one or more embodiments, the legally collected data may be a set of communication and transaction data between a person of interest (POI) and a set of correspondents of the POI. In one or more embodiments, the collection interface module may receive a set of communication and transaction data associated with a communication between the POI and a correspondent of the POI. In one or more embodiments, the POI may be a suspect in a criminal investigation, a lead in a criminal investigation, or any person of interest in a criminal and/or civil investigation. The correspondent of the POI may be an individual or an entity, in one or more embodiments. The correspondent of the POI may be any individual or entity that may communicate by any means with the POI, in one or more embodiments. In one or more embodiments, the POI may communicate with many correspondents of the POI as denoted as A, B, C, etc.

In one or more embodiments, there may be a set of collection servers spread through a region with an ability to connect to any network to receive the set of communication and transaction data of interest from the network. In one or more embodiments, the collection server may further include a storage module, a collection interface module and a data processing engine. In one or more embodiments, the collection interface module may further be linked to a data processing engine that may sort and organize the set of communication and transaction data. In one or more embodiments, the set of communication and transaction data may refer to any data associated the POI, and any raw data referencing a communication and/or a transaction between the POI and any correspondent of the POI.

In one or more embodiments, the POI may communicate with multiple correspondents of the POI, as mentioned above. The POI may communicate with these correspondents across a plurality of mediums of communication. In one or more embodiments, a medium of communication could comprise both physical and electronic modes of communication. The mediums of communication may include, but not be limited to telephony, telephone calls, cyber-communications, email communication, online chat conversations, in-person communications, social-media communications, written correspondence, mail correspondence, browser signatures and any other type of communications. In one or more embodiments, the collection server may, through the collection interface modules collect a set of communication and transaction data associated with these communications. For example, the set of communication and transaction data associated with the communications between the POI and the correspondent of the POI may be records of emails, records of online chat conversations, records on the database of a data processing unit associated with the POI, records of social media conversations and any other type of record that may be associated with a communication between the POI and a correspondent of the POI.

The data processing engine may then process the set of communication and transaction data to extract a metadata and a content of the set of communication and transaction data. For example, the analyst may be an agent and may want to further investigate a potential suspect in a murder case, and may want to investigate a set of emails sent by the suspect to find any possible leads between the person of interest and other people. Alternatively, the agent may want to read a content of the emails between the suspect and a friend of the suspect to understand a relationship between the person of interest and the victim and/or a modus operandi. The set of communication and transaction data may consist of a metadata (e.g. IP address, email address, cyber-address recipient address, sender address, time of the email, time of the mail, information on a post card, etc.). The metadata may be an information about the data in one or more embodiments. The metadata may encompass a time and place that the data was received. The metadata also encompass a set of information related to the senders and receivers of the information, a time of a communication event, or where an information was collected from. For example, if an email is sent to the POI, the metadata may consist of the sender and recipient addresses of the email, an IP address and a time of the email among others. The data may also consist of a content. The content may be the substantive part of the data collected. The data may consist of the actual text of the email, attachments in the email and what the information actually says. In the previous example, the content may be the actual text of the email which may be a solicitation for a crime. The system may make a distinction between content and metadata.

In one or more embodiments, the metadata may also be a cyber-name, a cyber-address, contact list, an analyst login information, a chat IP address, a chat alias, a VOIP address, a web forum login, a website login, a social network login, a sender and/or receiver of a chat, a time of a chat conversation, a file name sent in a chat or an email or any other cybercommunication, a number of files transferred in the cyber communication, a type of chat text, a name of an audio and/or video attachment sent in the cyber communication, a number of parties involved in a communication, a buddy list, an avatar description associated with the cyber communication. The metadata may also be associated with voice and/or voice over IP communications. The metadata may also be associated with social networking sites, and may include an analyst name, a time of a social networking communication or publication, a size of a social networking communication, a number of followers and others. The metadata may also include telephone numbers, phone numbers, IMSI information and/or IMEI information.

Similarly, the content may include the substantive portion of a record. In addition to the text of the communication, or a transcript of a recorded conversation, it may also include a text of an email attachment, a transferred file, a content of an uploaded or downloaded document/video or any other file, a pooled information between many users, a substance of social network communication, a tweet, a message exchanged between two parties, a substance of a text message, and any other communication.

In one or more embodiments, the collection interface module and the data processing engine may process the set of communication and transaction data to extract the metadata and the content of the set of the communication and transaction data. For example, the POI may initiate an online chat conversation with a correspondent of the POI. The collection interface module may immediately collect the set of communication and transaction data associated with online chat conversation between the POI and the correspondent of the POI. In one or more embodiments, the data processing engine may separate the contents of the online chat conversation to generate a metadata of the online chat conversation and a content of the online chat conversation. For example, the metadata of the online chat conversation may be an identity of the correspondent of the POI, and a time and a date of the online chat conversation. The content of the online chat conversation may be an actual transcript of the online chat conversation.

In one or more embodiments, the collection server may store the content in the storage module of the collection server. In one or more embodiments, the metadata and any text content may be transmitted to the service platform through a communication bus.

In one or more embodiments, the communication bus may be a mode of electronic transportation linking the set of collection servers sprawled across the world. In one or more embodiments, the metadata and any text content may be automatically transmitted to the database in the service platform. In one or more embodiments, the storage module may hold data records of the database. In one or more embodiments, the analyst at the service platform may then be able to immediately access the metadata and text content to analyze and visualize the set of communication and transaction data. If the analyst does decide to view the content, the analyst may request the information stored in the storage module and the content may then be transmitted to the analyst through the communication bus.

In one or more embodiments, the service platform may be connected to the collection servers through the communication bus. In one or more embodiments, the service platform may further contain a database and a number of modules that may help process, parse, analyze and visualize the set of communication and transaction data received from multiple collection servers around the world. In one or more embodiments, the service platform may further contain a notification module, a screening module, an analysis module, a reconstruction module, a real-time media replication module, and others.

The server may be any brand of server and any type of server computer, blade server or any other processing device capable to performing the data management and communication functions with any quantity of cores, e.g. a six (6) core X86 Intel Quad Xeon MP, which may be programmed for any type of operating system ("OS"), e.g., Solaris UNIX, LINUX, or other server computing OS. In one or more embodiments, the system may be run on an Intel86 based processor using Linux RHEL with 64 bit OS. The system may be run on a direct or NAS storage device or appliance. The system is not limited to Intel x86, Linux RHEL, Direct/NAS storages and can be implemented on any computer hardware, OS and storage devices. Any commercially available or proprietary design CPU may be used for this function given the adaptation and implementation of drivers specific to the actual device.

B. Reconstruction of the Set of Communication and Transaction Data

In one or more embodiments, the analyst at the workstation may work directly with the service platform and the set of communication and transaction data received at the service platform. In one or more embodiments, the analyst may want to refer to the set of communication and transaction data and look at the raw data of all the communications involving the POI and all his correspondents. The analyst may also want to make sense of the raw data and the set of communication and transaction data and may want to understand and analyze the set of communication and transaction data.

In one or more embodiments, the service platform may further consist of a visualization module and a reconstruction module. In one or more embodiments, the service platform may also contain a database, a sorting module and a search module. In one or more embodiments, the service platform may also contain a data processing engine to work with various modules present in the service platform to analyze, sort and visualize the set of data collected at the service platform.

In one or more embodiments, the reconstruction module may organize the set of communication and transaction data associated with the POI. In one or more embodiments, the reconstruction module may pool together a set of communication and transaction data associated with all communications between the POI and a correspondent of the POI A. In one or more embodiments, the reconstruction module may store all communication between the POI and the correspondent of the POI A regardless of the medium of communication. In one or more embodiments, the reconstruction module may organize the set of communication and transaction data based on a date of the communication. In one or more embodiments, the reconstruction module may automatically link the POI with the correspondent of the POI A when the first communication and transaction data between the POI and the correspondent of the POI A is received. The reconstruction module may automatically create an organized reconstruction folder of communications between the POI and the correspondent of the POI A to track all communications and store the related communication and transaction data of any new communications in the organized reconstruction folder. For example, the reconstruction module may create an organized reconstruction folder for "POI-A", "POI-B" and so on. In one or more embodiments, the organized reconstruction folder may only contain the metadata associated with the particular communication. In one or more embodiments, the analyst may be able to click on the particular communication to view the content of the particular communication as well.

In one or more embodiments, the reconstruction module may automatically predict a link between the POI and another individual based on the set of communication and transaction data. In one or more embodiments, the reconstruction module may further employ a set of metrics to distinguish the types of communication and transaction data associated with the POI and his communication with the correspondent of the POI A. For example, the reconstruction module may further organize the set of communication and transaction data, such that all online chat conversations are organized in a separate subfolder. In one or more embodiments, the reconstruction module may track the various types of communication and transaction data associated with the POI. For example, the reconstruction module may track all communication instances between the POI and the correspondent of the POI. A communication instance may be any type of communication regardless of the medium of communication.

Further, the reconstruction module may pool together a set of communication and transaction data associated with multiple online identities associated with the POI, in one or more embodiments. In one or more embodiments, the reconstruction module may identify that a particular online identity belong to the POI. In one or more embodiments, the reconstruction module may store that particular communication in the organized reconstruction folder associated with the POI. The reconstruction module may automatically consolidate the set of communication and transaction data for all the online identities associated with the POI, in one or more embodiments. For example, the POI may have three different email addresses and may have communicated with A using all three email addresses. The reconstruction module may automatically identify the plurality of mediums, and online address and organize this particular communication and transaction data under "POI-A".

In one or more embodiments, the reconstruction module may be equipped with a search and/or filter capability. In one or more embodiments, the reconstruction module may automatically filter the set of communication and transaction data based on a search and/or filter term entered by the analyst. For example, the analyst may look at the organized reconstruction folder "POI-A" and see a whole list of communications between POI and the correspondent of the POI A across various mediums and including all online identities. The analyst may only be interested in looking at one particular online identity. The analyst may simply search for that relevant information by entering the query, and the reconstruction module may search within the organized reconstruction folder based on the query terms and fields entered by the analyst.

In one or more embodiments, the reconstruction module may organize the organized reconstruction folder based on a set of preferences of the analyst. The set of preferences of the analyst may include but may not be limited to a time stamp of a communication and transaction data, a priority level of the communication and transaction data, an online identity of a sender or recipient of a communication of transaction data, a medium of communication, a data type of a communication or transaction data, an attachment type of a communication and transaction data, an alphabetical order of the communication data or any other criteria as chosen by the analyst.

In one or more embodiments, the reconstruction module, in conjunction with the visualization module may visually depict a set of relationships between the POI and a set of correspondents of the POI based on the set of communication and transaction data in a link chart. In one or more embodiments, the visualization module may create a link chart for the POI that may depict a set of relationships between the POI and all correspondents of the POI. In one or more embodiments, each POI in the system may have at least one link chart associated with all communications related to the POI. In one or more embodiments, the link chart may be a visual means of representing any data related to a particular POI. For example, a link chart showing all relationships of the POI based on the set of communication and transaction data may depict the POI, and show links to all correspondents of the POI. In one or more embodiments, the POI may be linked to a correspondent of the POI through a communication link. The communication link may be depicted through various visual forms. For example, the visual form may simply be an arrow, a line, a dotted line, a broken line, a thick line, a thin line, a colored lined, a label, an alert, a chart, or any other visual way of showing a link between the POI and the correspondent of the POI. In one or more embodiments, the visualization module may automatically select a particular visual form of the communication link between the POI and the correspondent of the POI based on a set of predetermined visualization options. In one or more embodiments, the set of predetermined visualization options may include at least one of a frequency of communication, a number of communication instances, an importance of a particular communication instance, a priority level of a communication instance, a keyword in the content of the communication and transaction data, an identity of the correspondent of the POI, a manual preference of the analyst, a time of the communication instance and a type of communication instance.

In one or more embodiments, the visualization module may also automatically modify a visual form of the communication link based on the sets of predetermined visualization options and when a predetermined condition stipulated by the analyst is met. For example the predetermined condition stipulated by the analyst may be a number of communication instances, a weight of communication instances, a priority of communication instances and any other condition that the analyst may stipulate.

For example, the analyst may be able to stipulate a condition such that when the number of communication instances is greater than 100, the communication link, which was initially depicted with a visual form of a single thin arrow, may now change to take the visual form of a single thick arrow. In one or more embodiments, the analyst may be able to select a predetermined condition to allow the system to automatically use a particular visual form of the communication link. In one or more embodiments, the visualization options may also include variables regarding any part of the link chart or visualization associated with the POI.

In one or more embodiments, the predetermined visualization option may be a function of a priority and/or weight of a particular communication link and the underlying organized reconstruction folder. In one or more embodiments, the system may automatically assign a weight to the communication link based on the contents of the organized reconstruction folder associated with the communication link. The weight may be a function of a complex or a simple algorithm. For example, weights of communication links may range from 0-1. A particular communication link may have a low weight of 0.1 based on a low number of communication instances. However, the weight may immediately shoot up to 0.9 if a particular keyword is part of the underlying communication and transaction data. In one or more embodiments, the predetermined visualization options may also be based on the weight of the communication link.

In one or more embodiments, the reconstruction module and the visualization module may be interconnected such that the organized reconstruction folder of organized data associated with the POI and the correspondent of the POI A is automatically populated when the analyst 110 clicks on the communication link "POI-A" of the link chart for the POI. For example, the organized reconstruction folder "POI-A" containing the set of communications between the POI and A is automatically generated when the communication link "POI-A" is clicked. In one or more embodiments, as discussed above, the analyst may be able to search and/or filter within the organized reconstruction folder "POI-A". In one or more embodiments, the analyst may be able to further view the content of a particular communication instance by clicking on the communication link on the link chart. For example, if the analyst wants to study a particular email between POI and A, he will be able to view the contents of the email for further inspection through the organized reconstruction folder. In one or more embodiments, an analyst may enter a search term or a query term. The system may automatically filter through the organized reconstruction folder to generate a set of search results or query results based on the query or search term. In one or more embodiments, the set of query results may span multiple organized reconstruction folders. The reconstruction module may automatically filter through the communication and transaction data contained in the organized reconstruction folder to generate the set of results based on the query.

FIG. 1 is a figure of the system architecture and illustrates, in detail, the service platform 164, the collection server 160, the communication bus 162, the set of communication and transaction data 104, the database 170, the visualization module 120, the link charts 102, the reconstruction module 130, the network 150, the workstation 118, the network being used by the POI 160.

In one or more embodiments, the collection server 160 may be able to collect a set of communication and transaction data from a data processing unit associated with a person of interest and that set of data may be communicated to the service platform 164 through the communication bus 162, as discussed before. The set of data collected from the network being used by the POI may be stored in the database 170, in one or more embodiments. In one or more embodiments, the service platform 164 may further contain a visualization module 120 and a reconstruction module 130. In addition, the service platform 164 may further contain a set of other modules that may work on the set of communication and transaction data collected in different ways.

In one or more embodiments, the reconstruction module 130 may also be linked to the visualization module 120 to reconstruct a set of communications between the POI and a set of correspondents of the POI and to visualize the relationships between the POI and the set of correspondents of the POI. In one or more embodiments, reconstruction module 130 may also identify a set of online identities associated with the POI based on a set of predetermined identifiers. For example, the predetermined identifier may include all known email addresses for the POI, or the system may also predict that an online identity is associated with the POI based on other predetermined identifiers. In one or more embodiments, the set of predetermined identifiers may include known addresses, name of the correspondent, IP address of the correspondent, a computer being used by the correspondent, a telephone and/or mobile phone being used by the correspondent, or any other identifier. In one or more embodiments, any new online identities for the POI may have to be confirmed by the analyst manually.

In one or more embodiments, as discussed above, the reconstruction module 130 may further consolidate the set of communication and transaction data associated with the POI, and further organize the communication and transaction data in an organized reconstruction folder, with many sub-folders. In one or more embodiments, as discussed above, the reconstruction module 130 may create links between the POI and correspondents of the POI based on the set of communication and transaction data. In one or more embodiments, as discussed above, the reconstruction module 130 may be searched by keyword, correspondent name or any other search term.

More generally, in one or more embodiments, the POI may interact with a set of correspondents through various means of communication. As discussed previously, the communication may be an in-person communication, a telephonic communication and/or an online communication. In one or more embodiments, the set of communication and transaction data may contain a set of vital information regarding the POI's online activity. In one or more embodiments, the set of communication and transaction data may contain a set of IP addresses visited by the POI, a set of email conversations, a set of chat conversations, and any other online activity by the POI. For example, the POI may have multiple email addresses, a Twitter® account, a Facebook® account, a Google® chat messenger account and multiple browser signatures associated with multiple devices he may be using. In one or more embodiments, the analyst 110 may want to track and understand a set of activity not through only one medium of communication (for example, not just email), but may want to simultaneously understand the POI's activity through all of POI's online activities. For example, the POI may be connected to A through a particular email account. The POI may be connected to B through Twitter®. Therefore, B may be connected to A, but the analyst 110 may have missed the connection between A and B because the POI may have communicated with A and B through two different mediums of communication. By consolidating the set of raw data dealing with the communication and transaction data associated with the POI and identifying multiple online identities and mediums of communication associated with the POI, the analyst 110 may successfully see the connection between the POI and A and B. In one or more embodiments, the reconstruction module may automatically make the connections and link the POI to both A and B. In one or more embodiments, a browser signature may be an "internet browser identification" that may be uniquely identified and tied to a specific data processing system, personal computer, laptop, desktop, smartphone or PDA. In one or more embodiments, the system may identify the browser signature of a particular piece of communication and transaction data and associate it with a device associated with the POI. In one or more embodiments, the analyst may know that a specific device is being used by the POI and the system may automatically recognize that particular browser signature as a medium of communication for the POI. For example, all activity done from that particular POI may be organized under the organized reconstruction folder for the POI.

In one or more embodiments, the reconstruction module 130, in conjunction with the visualization module 120 may visually depict these relationships and links as well. In one or more embodiments, a medium of communication may be email, chat, phone conversation, a documented in-person meeting, a browser signature, a Twitter® message, a Facebook® message, a social media communication, a telephony call, an instant message and other mediums of communication. In one or more embodiments, the reconstruction module 130 may work with the data processing engine 122 to successfully recreate a path of communication across multiple mediums of communication between a set of correspondents of the POI and the POI. In one or more embodiments, the visualization module may work in conjunction with the reconstruction module to visually represent the connection between the POI and the set of correspondents of the POI.

Figure 2:
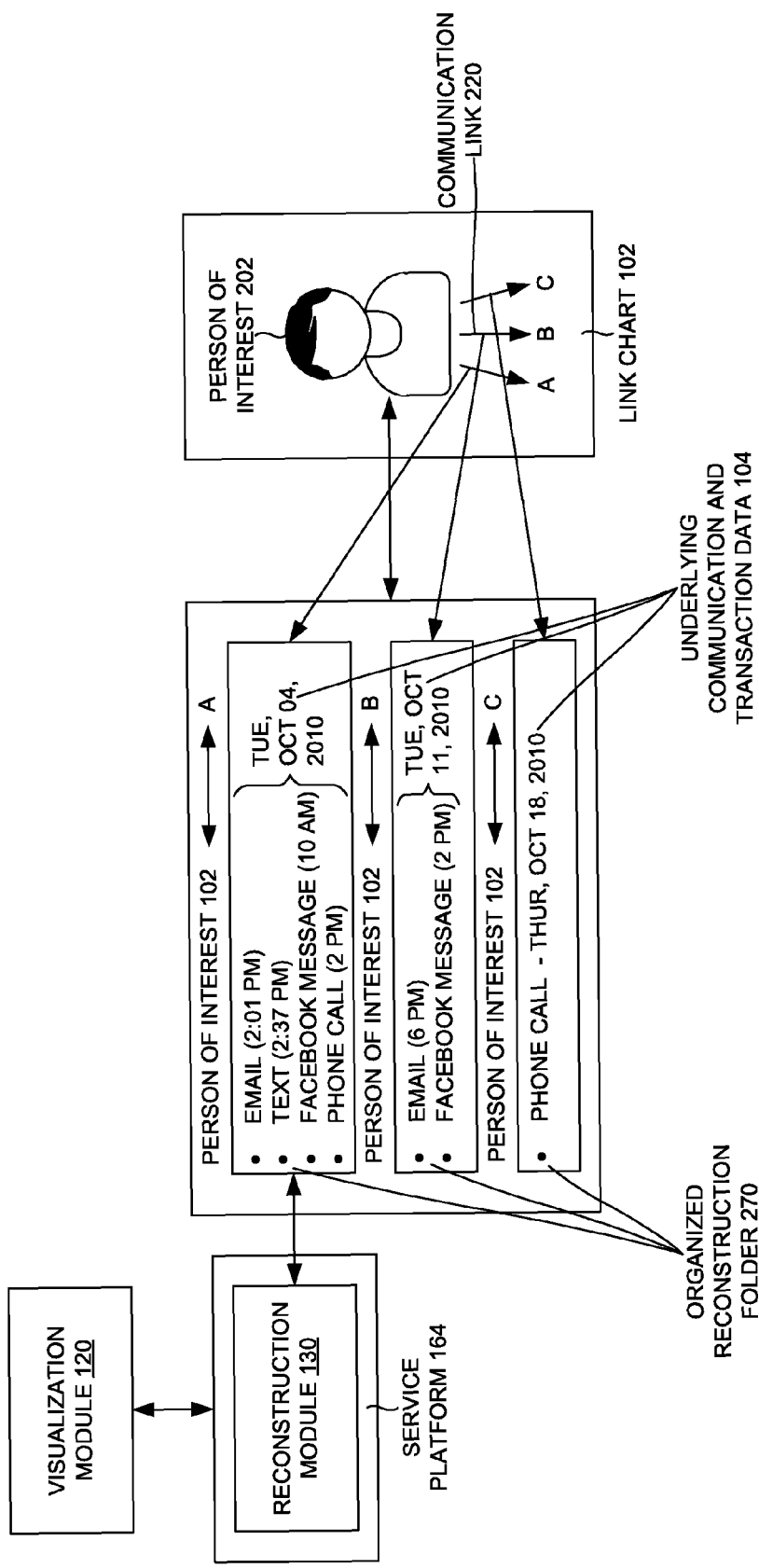
FIG. 2 illustrates the system overview illustrating the reconstruction module, organizing the set of raw data related to a set of communications between the POI and various correspondents of the POI.

FIG. 2 illustrates the service platform 164, the reconstruction module 130, the visualization module 120, the link chart 102, the communication links 220, the organized reconstruction folder 270 and the set of communication and transaction data 104 corresponding to the communication link, and the POI 102.

In one or more embodiments, the POI 202 may communicate with many correspondents through multiple mediums of communication. In one or more embodiments, the POI may communicate with the same correspondents through multiple mediums of communication. For example, the POI 202 may communicate with A over email, and may also communicate with A over instant messenger as well. In one or more embodiments, the communication may occur over a period of days, and/or over a long period of time. In one or more embodiments, both the POI and the correspondents of the POI may have multiple online identities. In one or more embodiments, the data processing engine may identify online identities associated with the POI as well as correspondents of the POI. In one or more embodiments, a POI may have a set of online identities that he may use for various online programs. In one or more embodiments, an online identity may be a username at a particular program, an email address, a telephone number, a chat messenger ID, a Twitter account, a Facebook account and other usernames associated with the POI. For example, he may have an email address xyz@gmail.com. He may also have a Yahoo® messenger ID with a username of "SwiftYahoo". He may have a Twitter Account® with a username of "@raindeer." The POI may have such multiple online identities with various chat vehicles, and other programs. In one or more embodiments, the analyst 110 may not know that the POI has multiple online identities. In one or more embodiments, the reconstruction module 130 may work with a set of predetermined identifiers to determine that two separate online identities belong to the same POI. In one or more embodiments, the set of predetermined identifiers may include a set of known addresses or identities of the POI, a name of the correspondent, IP address of the correspondent, a computer being used by the correspondent, a telephone and/or mobile phone being used by the correspondent, a set of common text between the two online identities, a frequency of usage of particular online identity from a source of interception, a sign-in information derived from the network during interception, a similarity in usernames, and other identifiers. In one or more embodiments, the reconstruction module 130 may identify a set of online identities that may be connected to the same POI based on the predetermined identifiers identified above.

In one or more embodiments, the reconstruction module 130 may consolidate the set of raw data associated with the different online identities belonging to the same POI and a set of raw data associated with various communications with correspondents through multiple mediums of communication over a long period of time in an organized reconstruction folder. In one or more embodiments, the reconstruction module 130 may organize this set of data chronologically, such that all communications between the POI and A appear together, and all communications between the POI and B appear together. In one or more embodiments, the analyst 110 may be able to search and filter through the organized reconstruction folder or the entire database, as discussed previously. In one or more embodiments, the reconstruction module 130 may track a set of communications between the POI 202 and a particular correspondent, and may automatically notify the analyst 110 when a new communication is entered between the POI and that particular correspondent. In one or more embodiments, the analyst 110 may be able to filter the set of raw communication and transaction data, and search within this raw data to organize the set of raw data differently, or to search within the raw data to only return a set of communications based on a set of search criteria. For example, the analyst may only be interested in email communications between the POI and the particular correspondent. The analyst may be able to filter out the non-email communications to only generate email communication. In another example, the analyst may only be interested in communications between the POI and the particular correspondent within the last week. The analyst may be able to enter a search criteria and the system may generate a set of results based on the search criteria.

In one or more embodiments, the visualization module 120 may work in conjunction with the reconstruction module 130 to visually generate a visual representation of the communication data between the POI and a set of correspondents of the POI. In one or more embodiments, the visualization module may generate a set of link charts 102 based on the communication and transaction data 104. In one or more embodiments, the link charts 102 may represent, through a set of communication links 220 a connection and/or a communication between the POI and a correspondent. In one or more embodiments, the underlying set of communication and transaction data 104 associated with the actual communication between the correspondent and the POI may be easily viewed by clicking the communication link between the POI and the correspondent. For example, as shown in the Figure, when the analyst clicks on the communication link between the POI and A, he may be immediately be able to see all the communications between the POI and A, including various mediums of communications and various online identities of the POI and A as well. In one or more embodiments, the analyst may be able to search within this set of raw data to further filter and/or analyze the results.

Figure 3:
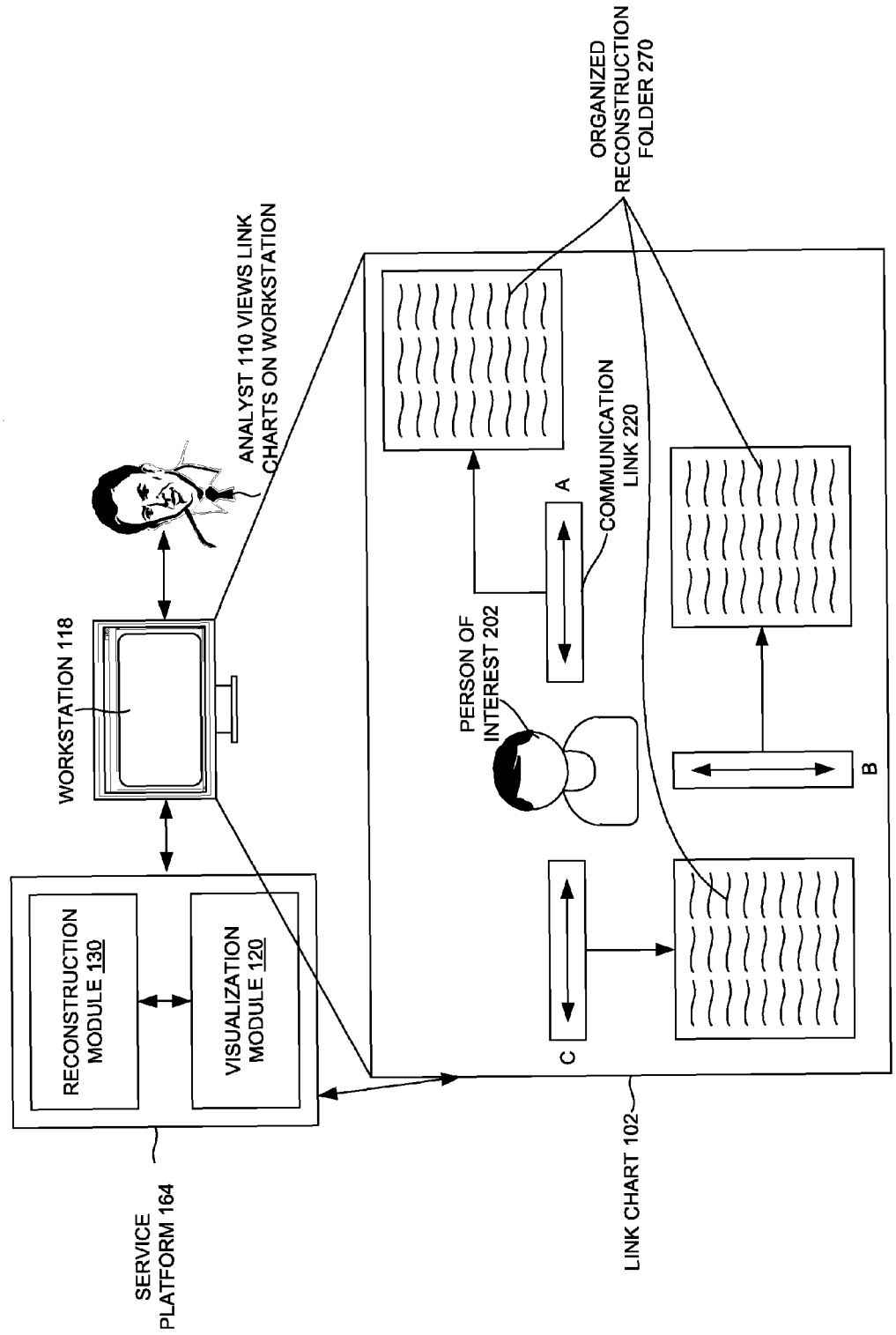
FIG. 3 illustrates a closer view showing the workings of the reconstruction module and the visualization module at the service platform in generating the link charts and the on demand reconstruction of the events representing the communication links between the POI and correspondent of POI at the workstation

FIG. 3 illustrates a detailed view of the reconstruction module 130, the visualization module 120, the service platform 164, the set of communication and transaction data 104, the organized reconstruction folder 270, the link chart 102 the communication links 220, and the POI 202.

In one or more embodiments, the visualization module 120 may visually a set of links between the POI and correspondents of the POI. In one or more embodiments, the visualization module 120 may generate a set of link charts 102 and create a set of communication links 220 between the POI and a set of correspondents of the POI in a graph, a chart and/or any other visualization. In one or more embodiments a communication link 220 may be represented by an arrow in between the POI and the set of correspondents A, B and C or any other visual form, as discussed previously The link chart 102 may represent all the communications between the POI and the set of correspondents regardless of the medium of communication and the online identity of the POI or online identity of the correspondent of the POI. In one or more embodiments, the analyst 110 may be able to view the entire set of communication and transaction data associated with the set of communications between the POI and the set of correspondents by hovering over or clicking on the communication link 220. In one or more embodiments, clicking on the communication link 220 may automatically populate the organized reconstruction folder 270 showing all communications between the POI and a particular correspondent. For example, the POI's online identity xyz@gmail.com may have communicated with A who may have an email address abc@gmail.com. The visualization module 120 may generate the communication link 220 between the POI and A based on this raw data of communication between A and the POI. The set of raw data may be embedded within the communication link such that the organized reconstruction folder 270 describing the communication automatically populates so that the analyst 110 can view and analyze the actual communication between A and the POI. In one or more embodiments, the analyst 110 may be able to hover over a communication link and the organized reconstruction folder may automatically populate so that the analyst is able to view the organized reconstruction folder 270 related to all communication between the POI and A.

Figure 4:
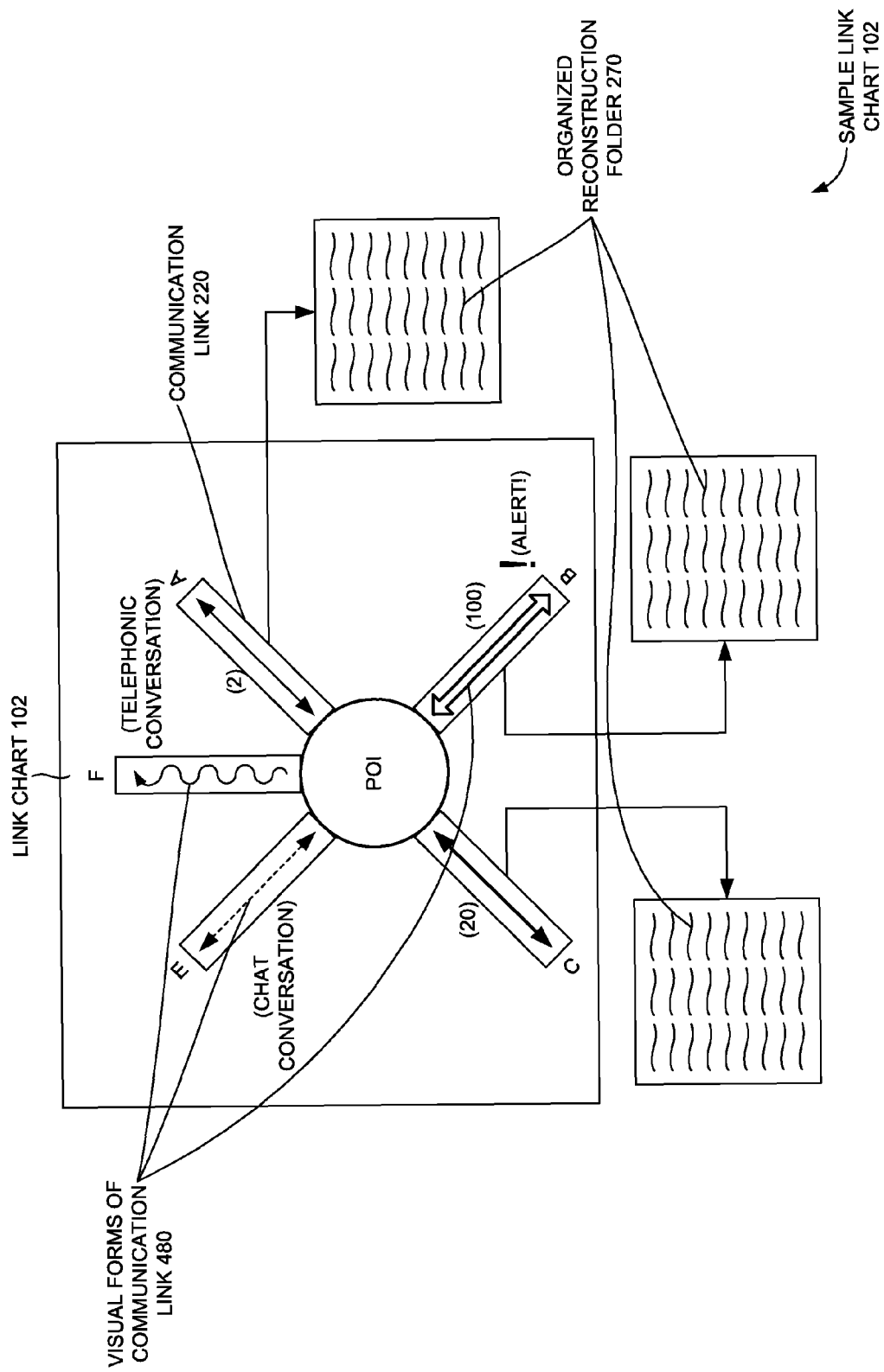
FIG. 4 illustrates a sample link chart.

FIG. 4 illustrates a detailed view of a sample link chart 102. The Figure also depicts how there are various visual forms within the link chart, and how the organized reconstruction folder 270 can be embedded such that the organized reconstruction folder 270 automatically populates when the communication link 220 is clicked.

In one or more embodiments, the visualization module 120, in conjunction with the reconstruction module 130 may generate a set of link charts associated with the POI. As discussed previously, the link charts 102, generated by the visualization module 120, may contain various visual forms. For example, the arrow between the POI and a correspondent may be color coded depending on the nature of the underlying communication and transaction data 104. The POI may be depicted by a special symbol, whereas all correspondents may be denoted simply by name, symbol or some other means. The system may automatically visually depict a communication based on the nature of the underlying communication and transaction data 104, as discussed previously. For example, when there are only chat conversations between the POI and F, as shown in the Figure, the visual form for the communication link 220 may be a dashed line. The visual form for the communication link 220 between POI and F, as shown in the Figure may be a squiggly line because the communication type was a telephonic conversation. The visual form for the communication link 220 between the POI and B may be thicker than that of POI and A, for example, because the number of communication instances between the POI and B may have exceeded the predetermined threshold level of 50 (as an example). Similarly, the link chart could also include vital information about the type of communication between the POI and the correspondents, a frequency of communication between the POI and the correspondents, a most recent communication between the POI and the correspondent, etc. In another example, when there is a new communication between the POI and a known correspondent, the link chart 102 may also show an alert as shown in the Figure. In one or more embodiments, the analyst 110 may also be notified of a new communication instance.

In one or more embodiments, the visualization module may automatically select and/or modify the visual form of the communication link based on the predetermined visualization options, as discussed before and any predetermined conditions that may have been met. The predetermined visualization options may also be a function of the weight of the communication link in one or more embodiments. In one or more embodiments the visual form of the communication link may only be based on the weight of the communication link.

In one or more embodiments, the analyst 110 may be able to customize the link chart based on his needs and may be able to stipulate, select, modify or add to the predetermined conditions. As discussed previously, the analyst 110 may be able to stipulate that the visual form of the communication link change automatically when the number of communication instances has exceed a threshold level. The analyst 110 may be able to select, and/or modify labels, colors, symbols etc. to the link chart 102. The visualization module 120 may automatically create the link charts 102 based on the parameters stipulated by the analyst 110 in the predetermined conditions and the predetermined visualization options.

Although the present embodiments have been described with reference to specific example embodiments, it will be evident that various modifications and changes may be made to these embodiments without departing from the broader spirit and scope of the various embodiments.

What is claimed is:

1. A method, using a physical processor and memory, comprising:
   automatically determining that a person of interest (POI) under surveillance has communicated with a correspondent of the POI;
   creating a communication link between the POI and the correspondent of the POI;
   consolidating a set of communication and transaction data corresponding to a communication between the POI and the correspondent of the POI across a plurality of mediums of communications in an organized reconstruction folder associated with communications between the POI and the correspondent of the POI;
   generating a link chart associated with the POI to visually represent the communication link between the POI and the correspondent of the POI;
   embedding the organized reconstruction folder associated with communications between the POI and correspondent of the POI within the communication link within the link chart between the POI and the correspondent of the POI such that the organized reconstruction folder automatically populates when a user selects the communication link in the link chart between the POI and the correspondent of the POI;
   merging a visual node of the link chart representing the POI with a visual node of the link chart representing an entity communicating with the correspondent with an online identity when at least one of a collection server and a service platform determines that the online identity is associated with the POI; and
   consolidating the set of communication and transaction data in the organized reconstruction folder with a second set of communication and transaction data in a second organized reconstruction folder associated with communications between the entity and the correspondent of the POI.

2. The method of claim 1 further comprising:
   tracking a number of times the POI has communicated with the correspondent of the POI across a plurality of mediums of communications to generate a set of communication associations between the POI and the correspondent of the POI.

3. The method of claim 1 further comprising:
   tracking a number of times the POI has communicated with the correspondent of the POI to including a set of online identities associated with at least one of the POI and the correspondent of the POI to generate a set of communication instances between the POI and the correspondent of the POI.

4. The method of claim 1 further comprising:
identifying a set of online identities associated with the POI;
consolidating the set of communication and transaction data corresponding to the set of online identities associated with the POI; and
when a particular online identity associated with the POI communicates with the correspondent of the POI, automatically tracking the communication as a communication instance in the organized reconstruction folder associated with communications between the POI and the correspondent of the POI.

5. The method of claim 1 further comprising:
visually representing a set of communication links between the POI and a set of correspondents of the POI in a single link chart associated with the POI.

6. The method of claim 5 further comprising:
automatically selecting a visual form of the communication link between the POI and the correspondent of the POI based on a set of predetermined visualization options,
wherein the set of predetermined visualization options includes at least one of a frequency of communication, a number of communication instances, an importance of a particular communication instance, a priority level of a communication instance, a keyword in the content of the communication and transaction data, an identity of the correspondent of the POI, a manual preference of an analyst, a time of the communication instance and a type of communication instance.

7. The method of claim 6 further comprising:
automatically modifying the visual form of the communication link between the POI and the correspondent of the POI based on a set of predetermined visualization options when a predetermined condition stipulated by the analyst is met.

8. The method of claim 1 further comprising:
further organizing the organized reconstruction folder associated with the communications between the POI and the correspondent of the POI based on a set of preferences of the analyst.

9. The method of claim 1 further comprising:
filtering the set of communication and transaction data within the organized reconstruction folder associated with the communications between the POI and the correspondent of the POI based on a query term entered by the analyst; and
generating a set of results based on the query term entered by the analyst within the organized reconstruction folder associated with the communications between the POI and the correspondent of the POI.

10. A method, using a physical processor and memory, comprising:
determining that a person of interest (POI) has communicated with a correspondent of the POI when a first communication instance occurs between the POI and the correspondent of the POI;
automatically creating an organized reconstruction folder associated with communications between the POI and the correspondent of the POI when the first communication instance occurs between the POI and the correspondent of the POI;
automatically creating a communication link between the POI and the correspondent of the POI in a link chart when the first communication instance occurs between the POI and the correspondent of the POI; and
embedding the organized reconstruction folder associated with communications between the POI and correspondent of the POI under the communication link on the link chart between the POI and the correspondent of the POI in the link chart;
automatically selecting with a set of predetermined visualization options a visual form of the communication link between the POI and the correspondent of the POI based on the content of the organizational reconstruction folder,
wherein the set of predetermined visualization options includes at least one of a frequency of communication, a number of communication instances, an importance of a particular communication instance, a priority level of a communication instance, a keyword in the content of the communication and transaction data, an identity of the correspondent of the POI, a manual preference of an analyst, a time of the communication instance and a type of communication instance.

11. The method of claim 10 further comprising:
consolidating a set of communication and transaction data associated with a communication between the POI and the correspondent of the POI across a plurality of mediums of communications in the organized reconstruction folder.

12. The method of claim 11 further comprising:
tracking a number of communication instances between the POI and the correspondent of the POI including a set of online identities associated with at least one of the POI and the correspondent of the POI.

13. The method of claim 10 further comprising: automatically Modifying the visual form of the communication link between the POI and the correspondent of the POI based on a set of predetermined visualization options when a predetermined condition stipulated by the analyst is met.

14. A system comprising a processor communicatively coupled with a volatile memory and a non-volatile storage further comprising a service platform to: consolidate, process and organize a set of communication and transaction data associated with a communication between a POI and a correspondent of the POI A across a plurality of mediums of communications in an organized reconstruction folder associated with communications between the POI and correspondent of the POI;
automatically create a communication link between the POI and the correspondent of the POI based on the set of communication and transaction data associated with the communication between the POI and the correspondent of the POI in a link chart;
merge a visual node of the link chart representing the POI with a visual node of the link chart representing an entity communicating with the correspondent with an online identity when the service platform determines that the online identity is associated with the POI; and
consolidate the set of communication and transaction data in the organized reconstruction folder with a second set of communication and transaction data in a second organized reconstruction folder associated with communications between the entity and the correspondent of the POI.

15. The system of claim 14, wherein the service platform automatically populates the organized reconstruction folder associated with communications between the POI and the correspondent of the POI when an analyst selects the communication link between the POI and the correspondent of the POI on the link chart.

16. The system of claim 14, wherein the service platform automatically selects a visual form of the communication link between the POI and the correspondent of the POI based on a set of predetermined visualization options, wherein the set of predetermined visualization options includes at least one of a frequency of communication, a number of communication instances, an importance of a particular communication instance, a priority level of a communication instance, a keyword in the content of the communication and transaction data, an identity of the correspondent of the POI, a manual preference of the analyst, a time of the communication instance and a type of communication instance.

17. The system of claim 16 wherein the service platform automatically modifies the visual form of the communication link between the POI and the correspondent of the POI based on a set of predetermined visualization options when a predetermined condition stipulated by the analyst is met.

18. The system of claim 17 wherein the service platform automatically tracks a set of communication instances between the POI and the correspondent of the POI across a plurality of mediums based on the set of communication and transaction data.

19. The system of claim 14 further comprising:
a workstation associated with an analyst, to view the communication link between the POI and the correspondent of the POI;
a collection server:
  to collect a set of communication and transaction data from a network being used by the POI,
  to process the set of communication and transaction data,
  to extract a metadata and a content of the set of communication and transaction data,
  to store the content; and
a communication bus, to automatically transmit the metadata and a text content to the service platform from the collection service immediately at a time of collection of the set of communication and transaction data and to transmit the content to the service platform at a request of the analyst.

* * * * *